No. 776,187. PATENTED NOV. 29, 1904.
W. A. KÖNEMAN.
PROCESS OF RECLAIMING RUBBER FROM VULCANIZED RUBBER WASTE.
APPLICATION FILED MAR. 10, 1904.
NO MODEL.
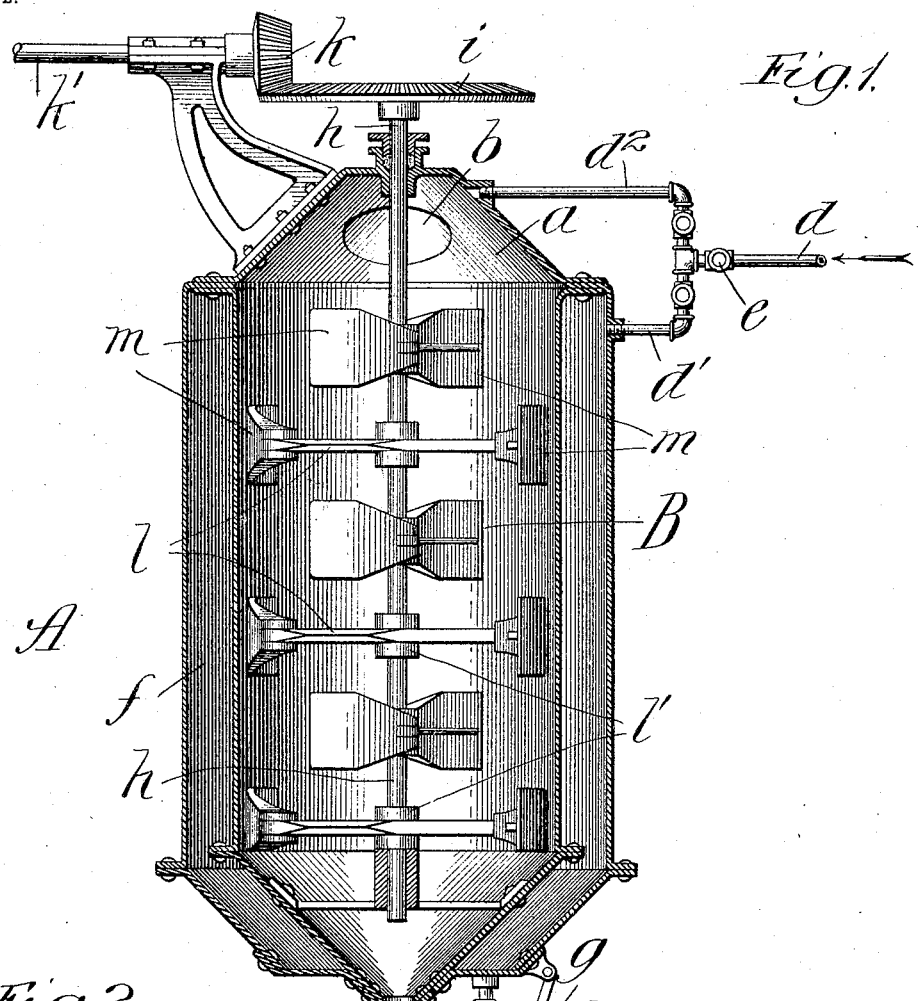
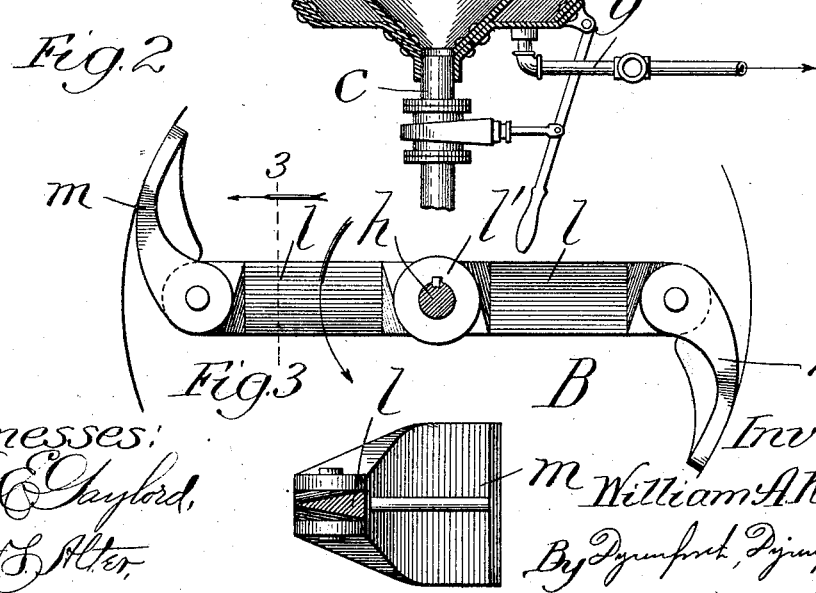

No. 776,187.

Patented November 29, 1904.

UNITED STATES PATENT OFFICE.

WILLIAM A. KÖNEMAN, OF CHICAGO, ILLINOIS.

PROCESS OF RECLAIMING RUBBER FROM VULCANIZED-RUBBER WASTE.

SPECIFICATION forming part of Letters Patent No. 776,187, dated November 29, 1904.

Application filed March 10, 1904. Serial No. 197,513. (No specimens.)

*To all whom it may concern:*

Be it known that I, WILLIAM A. KÖNEMAN, a citizen of the United States, residing at Chicago, in the county of Cook and State of Illinois, have invented a new and useful Improvement in Processes of Reclaiming Rubber from Vulcanized-Rubber Waste, of which the following is a specification.

My invention relates to an improvement in the treatment of rubber waste—such as worn-out hose, tires, shoes, and the like—to recover the rubber, which treatment as hitherto practiced consists, generally stated, in grinding the material to a degree of considerable fineness, washing it, and draining off the water, then adding a suitable alkali or acid in a solution of desired strength under pressure and at any one of different temperatures to effect devulcanization of the rubber and dissolve the fibrous material incorporated with it in the manufactured articles used as waste, and finally washing and drying the product thus obtained.

When rubber waste is cut up and disintegrated preparatory to treating it for recovery of the rubber, the cotton fiber remains in its original thickness and strength even where entirely separated from the rubber. The greater part of the fiber, however, is confined between layers of rubber, and the material operated upon as rubber waste is usually constituted of several alternate strata of rubber and fiber. When this material in the disintegrated condition referred to is thus subjected to treatment under pressure, either with an alkaline or an acid solution at a temperature of about 340° Fahrenheit, which is the temperature more commonly employed, and is agitated or worked in the solution, it requires about ten hours to dissolve the fiber, while devulcanization is completed within about three hours. Thus the devulcanized rubber remains under subjection to the action of the chemical in the solution at the high temperature for a prolonged period of time while the dissolution of the fiber is progressing toward completion, with the effect of deteriorating the rubber by impairing its elasticity.

The primary object of my invention is very greatly to expedite dissolution of the fiber constituent of the material under treatment, whereby it shall be dissolved, at least approximately or preparatorily, within the time required to effect devulcanization of the rubber, thus to avoid subjecting the latter to the influence of the chemical and the heat employed for an undue length of time, besides very materially reducing the time of treatment, with the consequent economical advantage. This I accomplish by reducing the fiber while the rubber in the material under treatment is undergoing devulcanization to an extreme degree of fineness, preferably that of the original cotton before it is spun, and at the same time producing a very fine subdivision of the rubber particles, with the effect of enabling a more thorough and expeditious removal of the filling and adulterating ingredients or impurities contained in the rubber waste and hastening its devulcanization. The entire treatment may be carried on in a suitable devulcanizer, though, as will hereinafter appear, I prefer, particularly when the chemical used in devulcanizing is an alkali, to effect the final dissolution of the fine fiber in a separate vessel.

For the devulcanization according to my improved procedure I have especially devised a novel construction of devulcanizer, illustrated in the accompanying drawings, in which—

Figure 1 is a view of the apparatus in vertical sectional elevation; Fig. 2, a perspective view of one of the rotatable frictional grinding or tearing arms employed in the devulcanizer, and Fig. 3 a section taken at the line 3 on Fig. 2 and viewed in the direction of the arrow.

A is a steam-jacketed vessel provided on its upper end with a cover $a$, containing a charging-hole $b$, and on its lower end with a valve-controlled discharge-hopper $c$. A steam-supply pipe $d$, containing a valve $e$, has valve-controlled branches $d'$ and $d^2$, leading, respectively, into the jacket $f$ and into the vessel A through its cover, and a valve-controlled exhaust-pipe $g$ leads from the steam-jacket. A shaft $h$ is journaled in vertical position centrally in the vessel A, to be rotated therein through the medium of a beveled gear-wheel $i$ on its upper projecting end and a beveled pinion $k$, meshing with the gear-wheel and supported on a rotary shaft $k'$, connected with suitable driving power. (Not shown.) On the shaft, which is shown to be rectangular in cross-section between its cylindrical ends, are carried within the vessel A a series of disintegrators B, each comprising a pair of arms $l\,l$, extending from a hub $l'$, fitting about the shaft, these disintegrators being spaced apart by their hubs, which seat one against the other in series and being arranged to extend from the shaft in staggered order, and on the end of each arm is pivoted to yield horizontally on its axis a shoe $m$, adapted to bear on its flat sole portion against the inner surface of the vessel A, the back of the heel portion of each shoe and of each arm $l$ being rendered of V shape in cross-section to reduce the resistance to the disintegrators in turning through the material undergoing treatment in the vessel.

The rubber waste to be treated is prepared, as usual, by disintegrating it, as by grinding, into a finely-divided condition, and also, preferably, by washing it. A quantity of this material is introduced into the vessel A through the charging-hole $b$ and also the chemical to be employed, which may be a suitable alkali, as caustic alkali, either in solution, if the material is moist, or in a dry and pulverized state or an acid, preferably sulfuric acid in solution. Where caustic alkali is the chemical employed, either dry or in solution, it may be used in the proportion of about one-fourth of a pound to each pound of rubber waste when the latter is very fibrous or of about one-eighth of a pound to each pound of the rubber waste when the latter contains comparatively little fiber. Where sulfuric acid is the chemical employed in the devulcanizing treatment, the proportion may be about one pound of the acid in solution to about ten pounds of the rubber waste. The contents of the vessel A are heated to from 320° to 360° Fahrenheit by steam introduced into the jacket $f$, steam being also admitted from time to time into the vessel through the branch pipe $d^2$, and the shaft $h$ is rotated in the direction to revolve the shoes $m$ backward against the inner surface of the vessel. The material is thus rubbed between the surface of the vessel and the soles of the shoes $m$, which yield to permit its introduction between the coöperating surfaces and are caused to bear outward by the centrifugal force of rotation, with the effect of exerting a frictional grinding or tearing action upon the rubber waste, which tends to separate from the fiber the rubber and reduce the latter to such a degree of fineness that a large proportion of it will pass through a one-hundred-mesh screen, thus enabling a much more perfect separation to be accomplished of the filling and adulterating ingredients contained in the rubber waste. The further and especially important effect of this frictional action of the disintegrators is to reduce the fibrous material to a very fine silk-like condition similar to that of the original cotton before spinning it, from which the fiber is manufactured. The described results are obtained within the time required for effecting devulcanization of the rubber under the action of the heat and chemical employed—say in about three hours—after which the action of the chemical in completely dissolving the finely-divided fiber is comparatively rapid, requiring only about from one and one-half to two hours.

It should be stated that when caustic alkali in a dry state is the chemical used it is mixed with the moist rubber waste in the devulcanizer and forms with the latter a pasty mass, which condition is maintained throughout the devulcanization operation by means of the steam supplied through the branch $d^2$.

While the entire treatment may be conducted in the vulcanizer A with the use either of an alkali or of an acid, it is preferred, particularly where an alkali is the chemical employed, to treat the material after devulcanization has been accomplished with an acid in a separate vessel of any suitable kind for dissolving the fiber reduced to the described degree of fineness and silk-like condition. Then the entire contents of the devulcanizer are removed and thoroughly washed with water to remove the chemical, if the latter be an alkali, and the material is thereupon boiled for about one and one-half to two hours in a weak solution of a suitable acid, preferably sulfuric, and which completely dissolves the fine fiber, besides effecting the solution of such of the adulterants as were not soluble in alkali. With the fiber reduced to the fine condition described a weak acid solution accomplishes in about two hours its dissolution, which requires approximately twenty-four hours to accomplish where the fiber is subjected to the action of the acid in the coarse or unreduced condition in which it has been the practice hitherto to treat it. After all the fiber has been thus dissolved the remaining rubber is thoroughly washed to remove the acid and then dried, and the dried product is pure or practically pure rubber with very little, if any, deterioration in the way of elasticity or otherwise from the condition in which it was originally used, ready to be again used in the arts.

It is preferred to use an alkali as the chemical in the devulcanizer because of its lubricating effect on the fiber, tending to soften the latter and cause it to yield more readily to the action of the disintegrators in shredding it than where an acid solution is employed as the chemical.

What I claim as new, and desire to secure by Letters Patent, is—

1. The process of reclaiming rubber from rubber waste, which consists in subjecting the waste material in a disintegrated condition to the action of heat and a suitable chemical to devulcanize the rubber, and simultaneously exerting a frictional tearing action on said material to separate from the fiber the rubber and further disintegrate the latter and reduce said fiber to a finely-divided condition, dissolving the reduced fiber, and washing and drying the resultant rubber product.

2. The process of reclaiming rubber from rubber waste, which consists in subjecting the waste material in a disintegrated condition to the action of heat and a suitable chemical to devulcanize the rubber and simultaneously exerting a frictional tearing action on said material to separate from the fiber the rubber and further disintegrate the latter and reduce the fiber to a finely-divided condition, dissolving the reduced fiber with the same chemical in the same operation, and washing and drying the resultant rubber product.

3. The process of reclaiming rubber from rubber waste, which consists in subjecting the waste material in a disintegrated condition to the action of heat and caustic alkali to devulcanize the rubber, and simultaneously exerting a frictional tearing action on said material to separate from the fiber the rubber and further disintegrate the latter and reduce the fiber to a finely-divided condition, washing out the alkali, dissolving the reduced fiber in acid, and washing and drying the resultant product.

WILLIAM A. KÖNEMAN.

In presence of—
  M. I. MACKENZIE,
  WALTER N. WINBERG.